United States Patent Office

3,819,685
Patented June 25, 1974

3,819,685
PREPARATION OF ESTERS FROM UNSATURATED
ALDEHYDES AND ALCOHOLS
Robert K. Grasselli, Chagrin Falls, and Dev D. Suresh,
Cleveland, Ohio, assignors to The Standard Oil Company, Cleveland, Ohio
No Drawing. Filed Dec. 6, 1971, Ser. No. 205,321
Int. Cl. C07c 69/54
U.S. Cl. 260—486 R    11 Claims

ABSTRACT OF THE DISCLOSURE

Acrylic esters and methacrylic esters are formed directly from the aldehyde by reacting acrolein or methacrolein with molecular oxygen and an alcohol in the presence of an oxidation catalyst under the conditions normally associated with the reaction of the aldehyde to the acid.

BACKGROUND OF THE INVENTION

The oxidation reaction where acrolein or methacrolein is oxidized to its corresponding acid is well known. The process conditions, catalysts and reactant proportions for such reactions are well documented, see for example U.S. Pats. 2,881,212; 2,881,213; 2,881,214; 3,021,366; 3,197,419; 3,326,817; and 3,365,489; Belgian Pats. 744,898; 745,055; and 763,423; British Pats. 1,094,328; 1,111,440; 1,127,677; 1,131,132; 1,131,133; and 1,170,851; German Pat. 1,924,496; and Canadian Pat. 810,234. These reaction parameters are directly applicable to the process of the present invention.

The esterification reaction where acrylic acid or methacrylic acid is esterified by reacting the acid with an alcohol is also well known. This esterification reaction is normally conducted in a separate reactor under conditions which are different from the conversion of the aldehyde to the acid. Thus, the esters of acrylic and methacrylic acid have been formed in a two-step process beginning with the aldehyde. Of course, it is well known that a two-step process is more expensive and cumbersome than a one-step process.

The possibility of a feasible one-step process for the conversion of an aldehyde to an ester has been ruled out. This rejection has been premised on the fact that alcohols when subjected to the reaction conditions encountered in the conversion of acrolein to acrylic acid are substantially destroyed. This degradation is clearly shown in Comparative Example A of the Specific Embodiments.

SUMMARY OF THE INVENTION

It has now been discovered according to the present invention that acrylic esters and methacrylic esters are directly prepared from the aldehyde and alcohol by adding an aliphatic or aromatic alcohol of up to about 10 carbon atoms to the oxidation reaction of acrolein or methacrolein which is normally associated with preparing the corresponding acid. Thus, the two-step process of the art—consisting of (a) an oxidation reaction where acrolein and methacrolein is reacted with molecular oxygen in the presence of an oxidation catalyst at an elevated temperature to form the corresponding acid and (b) an esterification reaction where acrylic acid or methacrylic acid is reacted with an alcohol to form the corresponding ester—is reduced to a simple one-step reaction.

As noted, the process conditions of the present invention are essentially identical to those employed in the oxidation of the acrolein or methacrolein to form the corresponding acid. The only substantial difference is that an alcohol is directly added to the oxidation reaction to obtain the ester rather than the acid.

The important parameter of the invention is the addition of the alcohol to the oxidation reaction. In the broad concept of the invention any aliphatic or aromatic alcohol of up to about 10 carbon atoms may be reacted. Alcohols of a higher molecular weight could be used, but precautions may be necessary to avoid a significant amount of combustion even though the alcohol is reacted in the presence of the aldehyde. Alcohols preferred in the present invention are alkanols of 1–4 carbon atoms and phenol. Methanol, ethanol and phenol are of special importance because of the desirable reaction obtained. Of special significance in the present invention are reactions with methanol because of the commercial desirability of these derivatives and the especially good reaction obtained using this alcohol.

The amount of alcohol employed in the reaction is not critical and depends primarily on the amount of ester desired in the reaction product. The quantity of alcohol added to produce a given result is easily determined by experience. This is conveniently accomplished by monitoring the reactor effluent and determining the appropriate adjustment in the reactant feed.

The alcohol is suitably added to the reaction at any point. The critical aspect of the point of addition is that the alcohol must be present in the reaction along with at least some of the aldehyde. In the preferred practice of the invention the alcohol is introduced into the reaction when at least about 50% of the organic materials in the reaction zone are the aldehyde.

Thus, according to the present invention, the alcohol may be mixed with the reactants or it may be injected separately at any point along the reactor. By any such means of introduction, the alcohol reacts to form an acrylic or methacrylic ester.

The other factors in the invention, such as the reactant ratios, catalyst, temperature condtiions and contact time, are all known in the art of preparing acrylic acid or methacrylic acid from their corresponding aldehydes. However, because these variables have preferred limits in the present invention, they will be discussed.

The catalyst employed in the present invention may vary widely. In its broad conecpt these catalysts are oxidation catalysts. Specifically, they are catalysts which oxidize aldehydes to acids, and in the particular context of the invention, they are catalysts which may be employed to oxidize acrolein or methacrolein to the corresponding acid. The nature of these catalysts varies substantially as different ingredients and methods of preparation are employed. Normally, the catalysts are metal oxides or complex metal oxide compositions although some components may be present in their zero valence state. In any event, the basic metal components and ratios are known. In the present invention catalysts which contain at least some molybdenum are preferred, with those catalysts which contain at least molybdenum and vanadium being especially preferred and those containing at least vanadium, tungsten, and molybdenum being of special interest because of their proven ability to form the ester from the aldehyde and alcohol.

Specific catalysts that are suitably employed in the present invention are those cited in the patents under Background of the Invention. Representative examples of such catalysts include:

$Co_{10}Te_{0.1}Mo_{12}O_{56}$;
$V_{2.5}Ge_{0.7}Mo_{12}O_x$;
$V_{2.4}Cu_{0.8}Al_{0.7}Mo_{12}O_x$;
$MoO_3 \cdot P_2O_5$;
$Mo_{0.5}TiSb_4O_x$;
$Mo_{0.5}FeSb_4O_x$;
$MoNiSb_4O_x$;
$Mo_2CoSb_4O_x$;
$V_6Co_{8.6}Sb_{17}Mo_{12}O_x$;
$CoMoO_x$;

$Sn_6Sb_6Mo_{12}O_x$ on $BPO_4$;
$V_{1.8}PMo_{12}O_x$;
$Cr_2PMo_{12}O_x$;
$AsPMo_{12}O_x$;
$V_3W_{1.2}Mo_{12}Sb_6O_x$;
$V_3W_{1.2}Mo_{12}Sn_6O_x$;
$V_3W_{1.2}Mo_{12}Sb_3Sn_3O_x$; and
$V_3W_{1.2}Mo_{12}Mn_3O_{53}$.

Of course, many more catalysts suitable for use in the present invention are known or can be devised and prepared by known techiques.

Another reaction variable that affects the desirability of the yield is the temperature. The temperature may vary widely. In the lower ranges, the temperature must be high enough to give the desired reaction. In the upper range, the temperature should not be so high that unacceptable amounts of degradation are obtained. Normally, temperatures of about 250° to about 450° C. are employed, with temperatures of about 300° to about 400° C. giving very desirable results.

The organic reactants in the process of the invention may be any of the aldehydes and alcohols discussed above. Preferred are reactions using arcolein because of the significant absence of side reaction.

In addition to the necessary reactants, the reactant feed may contain additional components, such as water, nitrogen, formaldehyde, acetic acid, olefins, paraffins, carbon monoxide, or carbon dioxide. Particularly surprising has been the discovery that the addition of water to the reaction produces a beneficial result. The amount of water may vary widely, but amounts of up to about 2 moles of water per mole of alcohol are desirable.

The reactant ratios may be adjusted within broad limits. The preferred ratio of aldehyde:oxygen:alcohol is approximately 1:0.2–4:0.1–10. Ratios of 1:0.5–2:1–6 are especially preferred. Oxygen is normally added as air. Of course, as the reactant ratios are varied, the conversion, yield and product distribution are affected, but acrylic and methacrylic esters are formed.

The contact time and other variables are not critical. The contact time is preferably about 0.5 to about 10 seconds, with contact times of about 1 to 6 seconds being preferred. The pressure may be atmospheric, subatmospheric, or superatmospheric. The reaction may suitably be run in a fixed bed or fluidized bed reactor.

SPECIFIC EMBODIMENTS

Comparative Example A.—Reaction of methanol alone over the oxidation catalyst

In the manner described in U.S. 3,567,773, Example 6, a vanadium-tungsten-molybdenum catalyst on a silicon dioxide support was prepared. The composition of the catalyst was approximately 62% $V_3W_{1.2}Mo_{12}O_x$ and 38% $SiO_2$.

A fixed bed reactor was constructed of a ⅜" inside diameter stainless steel tube 6" long which had an inlet for reactants and an outlet for products. The reactor was packed with 4 cc. of the catalyst. The catalyst was activated in the reactor at 330° C. under a flow of air for 30 minutes.

Maintaining a temperature of 330° C., a feed of 6 parts of air and one part of methanol was passed over the catalyst at a contact time of 1.5 seconds. The methanol was 60.3% converted to waste products. Thus, in view of the large waste of alcohol it would be expected that a simultaneous oxidation-esterification employing an alcohol would not be feasible. This result, along with results where both alcohol and aldehyde are reacted, is shown in Table I.

Examples 1–5—Preparation of methyl acrylate from acrolein and methanol

Using the reactor and catalyst of Comparative Example A, a number of experiments were conducted to exemplify the present invention. The reactant ratios, conditions of the reaction and results are shown in Table I.

TABLE I.—PREPARATION OF METHYL ACRYLATE FROM ACROLEIN AND METHANOL IN A ONE-STEP REACTION

| Example | Feed Acrolein/$N_2$/Air/$CH_3OH$ | Temp., °C. | Contact time, sec. | Acrolein to products, percent | Product selectivity, mol percent* Methyl acrylate | Acrylic acid | Conversion of $CH_3OH$ to waste, percent |
|---|---|---|---|---|---|---|---|
| Comp. A | 0/0/6/1 | 330 | 1.5 | | | | 60.3 |
| 1 | 1/0/6/1 | 330 | 1.5 | 40.0 | 40.0 | 57.1 | 15.3 |
| 2 | 1/0/6/1 | 330 | 3.0 | 61.2 | 37.0 | 59.8 | 18.0 |
| 3 | 1/0/6/1 | 350 | 1.5 | 93.5 | 32.9 | 63.8 | 39.8 |
| 4 | 1/3/3/1 | 330 | 1.5 | 18.0 | 45.8 | 48.6 | 9.0 |
| 5 | 1/0/6/1/1 $H_2O$ | 330 | 1.5 | 73.0 | 31.5 | 64.4 | 32.0 |

*Remainder of the products from acrolein other than methyl acrylate and acrylic acid is CO and $CO_2$.

Example 1 is a parallel experiment with Comparative Example A except that in Example 1 acrolein was added to the feed. The destruction of methanol to waste product was surprisingly reduced from 60.3% using no acrolein to 15.3% when acroelin was added to the feed.

Example 6.—Preparation of ethyl acrylate from acrolein and ethanol

Using the reactor and catalyst of Comparative Example A, a mixture of 1 acrolein/6 air/1 ethanol was fed into the reactor at 330° C. to give a contact time of 1.5 seconds. The acrolein was 50% converted to products. The products were 2 wt. percent ethyl acrylate and 98% acrylic acid. Only 4.7% of the ethanol went to waste products of carbon oxides.

Example 7.—Preparation of phenyl acrylate from acrolein and phenol

Using the reactor and catalyst of Comparative Example A, a mixture of 1 acrolein/6 air/0.5 phenol was fed over the catalyst to give a contact time of 3 seconds. At a temperature of 330° C., the acrolein was 23% converted to products. Of the products, 4.4% was phenyl acrylate and 95.6% was acrylic acid. The phenol was only 9% converted to waste.

Example 8.—Prepartaion of methyl methacrylate from methacrolein and methanol

Using the reactor and catalyst of Comparative Example A, a mixture of 1 methacrolein/6 air/1 methanol was fed over the catalyst at a temperature of 371° C. to give a 1.5 second contact time. The methacrolein was 6.5% converted to products. Of the product 33.5 wt. percent was methyl methacrylate and 66.5% was methacrylic acid. The methanol was about 30% converted to waste products.

Example 9.—Preparation of methyl acrylate over a Cu-V-Mo catalyst

According to the procedure shown in U.S. 3,567,772, a catalyst of $Cu_9V_8Mo_{51}O_x$ was prepared, charged to the reactor of Comparative Example A and activated. A mixture of 1 acrolein/6 air/1 methanol was fed over the catalyst at 330° C. for a contact time of 1.5 seconds.

The acrolein was 32.3% converted to products. The products contained 20.1% methyl acrylate and 19.5% acrylic acid. The methanol was 33% converted to waste.

Example 10.—Preparation of methyl acrylate over a Sb-Mo-W catalyst

An antimony-molybdenum-tungsten catalyst of the empirical formula $Sb_{2.5}Mo_{7.5}O_x \cdot W°_{1.5}$ was prepared. In a beaker, 432 g. of $MoO_3$ was suspended in 1800 cc. of distilled water and 11.03 g. of W° powder was added. In a second beaker, a slurry of 291.5 g. of $Sb_2O_3$ powder in 1800 cc. of distilled water was prepared. The two slurries were separately heated to reflux for 2 hours and then poured together. The final mixture was covered and stored. The material was drum dried, and the resulting product was dried overnight at 110° C. A portion of the dried catalyst was charged to the reactor of Comparative Example A and activated by heating at 330° C. in a stream of air for 30 minutes after activation, and a mixture of 1 acrolein/6 air/1 methanol was fed over the catalyst at 330° C. The acrolein was 5% converted to products which were 20% methyl acrylate. No acrylic acid was detected.

In the same manner as shown by the examples above, acrolein is reacted with other alcohols, such as butanol, t-butyl alcohol, hexanol, cyclohexanol, octanol, decanol, allyl alcohol, propargyl alcohol and naphthol, to give the corresponding acrylic ester. Also in the same manner, methacrolein may be reacted with these enumerated alcohols to form the corresponding methacrylic esters.

We claim:

1. In the process for preparing acrylic esters or methacrylic esters consisting of (a) an oxidation reaction where acrolein or methacrolein is reacted with molecular oxygen in the presence of an oxidation catalyst at an elevated temperature of about 250° to about 450° C. to form the corresponding acid, and (b) an esterification reaction where acrylic acid or methacrylic acid is reacted with an alcohol to form the corresponding ester, the improvement comprising: adding an aliphatic or aromatic alcohol of up to about 10 carbon atoms to the oxidation reaction of acrolein or methacrolein in such a manner that the acrylic ester or methacrylic ester is directly formed in the oxidation reaction.

2. The process of claim 1 wherein the alcohol is selected from the group consisting of alkanols of 1-4 carbon atoms and phenol.

3. The process of claim 1 wherein the alcohol is selected from the group consisting of methanol, ethanol and phenol.

4. The process of claim 1 wherein the alcohol is methanol.

5. The process of claim 1 wherein the oxidation catalyst contains at least some molybdenum.

6. The process of claim 1 wherein the oxidation catalyst contains at least molybdenum and vanadium.

7. The process of claim 1 wherein the oxidation catalyst contains at least vanadium, tungsten and molybdenum.

8. The process of claim 1 wherein the temperature is about 250° to about 450° C.

9. The process of claim 1 wherein water is present in an amount up to about 2 moles of water per mole of alcohol.

10. The process of claim 1 wherein acrolein is reacted.

11. The process of claim 1 wherein acrolein is reacted with methanol and air in the proportions 1/1/6 in the presence of a catalyst of vanadium, tungsten, and molybdenum on a silicon dioxide support at a temperature of 330° C. and a contact time of 1.5 seconds at atmospheric pressure.

References Cited
UNITED STATES PATENTS 3,230,248    1/1966    Yanagita _____ 260—486 R LORRAINE A. WEINBERGER, Primary Examiner P. J. KILLOS, Assistant Examiner U.S. Cl. X.R.

252—467; 260—479 R, 530 N